Patented Aug. 21, 1934

1,970,782

UNITED STATES PATENT OFFICE 1,970,782

PRODUCTION OF ACETONE FROM ACETALDEHYDE

Lloyd C. Swallen, Terre Haute, Ind., assignor to Commercial Solvents Corporation, Terre Haute, Ind., a corporation of Maryland No Drawing. Application January 9, 1930, Serial No. 419,750

24 Claims. (Cl. 260—134)

My invention relates to a process of obtaining acetone from acetaldehyde. More particularly, my invention relates to a process of obtaining acetone from acetaldehyde at elevated temperatures and, preferably, reduced pressures in the presence of appropriate catalysts.

In the past, acetone has generally been obtained commercially by one or the other of two extensively used methods. In the dry distillation of hard woods, pyroligneous acid, containing among other substances, acetic acid, is obtained. Calcium acetate obtained by the neutralization of this acid is converted in turn, into acetone by dry distillation. More recently large quantities of acetone have been obtained as a by-product in the production of n-butyl alcohol by fermenting carbohydrates. Both of these processes present certain disadvantages from a commercial viewpoint which need not be presented here.

In co-pending applications, U. S. Serial No. 310,906, filed October 6, 1928 and U. S. Serial No. 364,318, filed May 18, 1929 have been described processes of obtaining ketones from alcohols. I have now found that a process somewhat similar to those described in the aforementioned applications may likewise be applied to the preparation of acetone from acetaldehyde. In carrying out my new process acetaldehyde is subjected to the action of elevated temperatures, preferably in the presence of catalysts. Examples of my preferred method of carying out this new reaction will be described below.

Suitable catalysts for effecting the conversion of acetaldehyde to acetone at elevated temperatures may be selected from a wide range of materials. Among those which have been found to be efficacious for this purpose are the oxygen compounds of metals of the third and fourth periods of the periodic system, as for example, oxygen compounds of iron, manganese, copper and other heavy metals (that is to say, iron oxide, oxidized iron, manganic hydroxide, copper hydroxide, copper carbonate, etc.). Also, metals, as for example, iron, have been found capable of producing the reaction. Also substances or mixtures containing such substances, as for example, ferruginous minerals, may be employed advantageously.

The efficiency of catalysts of the above-mentioned character may be considerably increased by the use of auxiliary substances furthering the reaction, as for example, oxygen compounds of alkaline earth metals, including magnesium, such as calcium carbonate, calcium oxide, magnesium oxide and the like.

One of the most efficient catalysts which I have tried is of the character disclosed in United States Patents Nos. 1,625,924, 1,625,925, 1,625,926, 1,625,927, 1,625,928 and 1,625,929, issued April 26, 1927, for use in the production of synthetic methanol. These catalysts initially comprise a plurality of difficulty reducible metal oxides, a plurality of easily reducible metal oxides, and a metallic halide, as for example, zinc oxide, iron oxide and zinc chloride.

The following examples are illustrative of these catalysts:

Example I 8 kilograms of chromic nitrate ($Cr(NO_3)_3.9H_2O$) and 1.5 kilograms of nickel nitrate ($Ni(NO_3)_2.6H_2O$) are dissolved in 150 liters of water, and to this solution there is added the theoretical amount (5.4 liters of 12.75 normal) of ammonium hydroxide to precipitate chromium hydroxide and nickel hydrate. The solution is then centrifuged to recover the precipitate hydrates and the resultant precipitate is thoroughly washed with water, dried, and broken up into granules.

Example II 3900 grams zinc nitrate ($Zn(NO_3)_2.6H_2O$) and 500 grams uranium nitrate ($UO_2(NO_3)_2.6H_2O$) is dissolved in 5 liters of warm water. To this mixture is added sufficient potassium carbonate to precipitate all of the zinc and uranium as carbonate and basic carbonate. The resultant precipitate is recovered, washed, dried, and moistened with a solution containing 200 grams zinc chloride. The mass is again dried, and is broken up into granules, whereupon it is ready for use.

Example III 2600 grams of zinc nitrate ($Zn(NO_3)_3.6H_2O$) and 160 grams of tungstic oxide ($WoO_3$) are mixed and heated until the zinc nitrate is converted to zinc oxide. The resultant yellow mass is powdered and mixed with 400 grams of 50% zinc bromide solution. The resultant mass is dried and broken up into granules.

Example IV 2250 grams of cobalt nitrate ($Co(NO_3)_2.6H_2O$) are dissolved in 250 liters of water and the solution is heated to 95° C. There is then added 7.5 kilograms of zinc oxide after which the solution is vigorously stirred and sufficient ammonium hydroxide is added to precipitate the cobalt as cobalt hydrate. The precipitated mass is recovered by decantation and filtration, is washed, dried, and broken up into granules. The granules are then moistened with a solution containing 1480 grams zinc chloride and dried once more.

Example V 2600 grams of zinc oxide in powdered form are mixed by thorough sifting with 500 grams of black copper oxide. The resultant mixture is moistened with an aqueous solution containing 150 grams cuprous chloride and 200 grams of dextrin. The resultant mass is dried and broken up into pieces whereupon it is ready for use.

Example VI 160 grams chromium nitrate $(Cr(NO_3)_3 \cdot 9H_2O)$ are dissolved with heating in 60 c.c. water. After the solution has cooled 10 grams zinc chloride and 96 grams ferric nitrate are added. To the resulting cold solution 100 grams zinc oxide are then added with constant stirring. The resulting wet mass is heated in a porcelain evaporating dish to dryness and then placed in a copper crucible in which it is heated over a Fletcher burner to drive off the nitrogen peroxide fumes.

The material thus obtained is crushed sufficiently to pass a 65 mesh screen and to it 8.2 grams zinc chloride dissolved in 60 c.c. water are added. The product thus obtained hardens spontaneously and is olive green in color.

Below will be found a description of the composition and method of preparing a number of catalysts other than those of the above type, which have been found to be suitable for use in my new process. It is distinctly understood, however, that these examples as well as those listed above are cited merely as illustrative of the character of the catalyst mixtures which I prefer to use and that I am in no way bound to the use of the examples cited. Many other combinations may also be satisfactorily employed in my process.

Example VII 125 grams chromium nitrate
40 grams calcium acetate
96 grams ammonium carbonate The chromium nitrate and calcium acetate are dissolved in two liters of water. After warming to 50° C., the ammonium carbonate, dissolved in 300 c.c. of water, is added. After warming to 50°–60° C. for half an hour, the precipitate is filtered off, washed thoroughly on the filter, and dried in the air at room temperature. It is then broken up, screened to 8–14 mesh and used in this form.

Example VIII 135 grams ferric nitrate
100 grams calcium acetate
2 liters water
Precipitated with:
150 grams anhydrous potassium carbonate
500 c.c. water The procedure is the same as that described under Example I except that after filtering the precipitate as dry as possible, it is worked up with about two liters of distilled water until free from lumps; warmed for about half an hour at 50°–60° C.; then filtered and washed as usual.

Example IX 61 grams cupric nitrate
64 grams magnesium nitrate
2 liters water
Precipitated with:
450 c.c. of 10% sodium hydroxide solution.

The procedure outlined under Example I is then followed.

When acetaldehyde is passed at elevated temperature over suitable catalysts such as, for example, those described above, acetone is obtained together with certain other products, the character of which varies considerably, depending upon the presence or absence of other materials with the acetaldehyde being treated. I have found that in carrying out my new process it is not necessary that the acetaldehyde be absolutely pure. Other substances which do not react with the acetaldehyde or the acetone, or which do not react to form substances reacting in turn with these two compounds, may be present with the acetaldehyde without producing appreciably harmful effects. In some cases, as will be seen hereafter, the presence of such materials may even produce beneficial results.

The presence of diluents with materials being subjected to catalytic treatment has frequently been shown to have beneficial effects. In some cases, this is due to a reduction in the partial pressure of the material being treated. In other cases, the diluent may be of such a character as to inhibit or lessen the tendency for the material under treatment to decompose or to form condensation or polymerization products. In still other cases, the diluent may serve as what may be termed a "beneficial poison". In studying various types of catalytic reactions investigators have reported that the presence of certain additional materials act as partial poisons of the catalyst being employed in that they tend to prevent the catalyst from also accelerating secondary reactions of an undesirable character. Such a condition is found to be the case with acetaldehyde. At elevated temperatures and in the presence of certain catalysts, acetaldehyde is decomposed as follows:

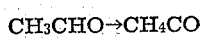
$$CH_3CHO \rightarrow CH_4CO$$

It has been found that the presence of certain diluent materials gives what may be termed a protective influence on the acetaldehyde and prevents the decomposition of the character pointed out above. Apparently secondary reactions of this character require a larger energy of activation as a result of strong preferential adsorption on the catalyst surface. Under ordinary conditions acetaldehyde at 350° C. and in the presence of, say, iron, is partly resinified and partly decomposed into carbon monoxide and methane. With other catalysts a similar reaction takes place at somewhat different temperatures.

It appears also that the catalytic conversion of acetaldehyde to acetone is carried out with somewhat better results at pressures appreciably lower than atmospheric than at ordinary pressures. Materials substantially inert under the conditions of the reaction may serve to lower the partial pressure of the acetaldehyde being reacted, and thus accomplish the same result as if the reactions had actually been carried out under a partial vacuum. The same effect is brought about by the use of diluent materials which act as protective or "beneficial poisons".

The particular pressure to be employed in the conversion of acetaldehyde to acetone depends to a large extent upon the economic considerations involved in the particular operation. For example, the pressure employed will depend upon the rate at which the aldehyde is conducted over the catalyst, the volume of the catalyst, the character of the catalyst used, the reaction temperature, cost of raw materials, method of recovering the unconverted acetaldehyde and the acetone formed during the reaction, and finally, the method adopted for attaining reduced pressure.

I may employ any of a number of methods of conducting the acetaldehyde over the catalyst under reduced pressure. These methods are equally satisfactory from the point of view of the efficacy of the reaction and the particular one adopted for use will depend upon the facilities available to the operator or the particular needs of a certain process. I may, for example, create a partial vacuum in the reaction chamber and introduce the acetaldehyde to be reacted at such a rate as to maintain the desired reduced pressure in the reaction zone. The acetone thus formed and the unconverted acetaldehyde are continually removed and recovered by any convenient method such as by condensing or by any suitable adsorption or solvent recovery process.

Another convenient method of attaining the desired reduced pressure is by mixing the acetaldehyde with a material inert under the conditions of the reaction, in sufficient quantity to reduce the partial pressure of the acetaldehyde, to the desired degree. Materials which I have found to be especially suitable for this purpose are, for example, carbon dioxide gas, nitrogen, hydrogen, carbon monoxide, methane, or the gaseous products formed during the reaction. In case it is desired to employ the vapors of an inert liquid compound as the means of obtaining the desired reduced pressure or of preventing the undesirable decomposition reactions, it is highly advisable that the material chosen be miscible with acetaldehyde and, preferably, easily vaporized. The mixture of acetaldehyde vapor and vapor of the inert material may be passed directly over the heated catalyst. More accurately regulated mixtures of acetaldehyde vapor and inert vapor—resulting in more accurately regulated partial pressure of the acetaldehyde—may be obtained by vaporizing the acetaldehyde and inert material in different vessels and later mixing the desired quantities of vapors of the two substances. When an uncondensible gas or a material in which the acetone is not soluble is employed as the means of reducing the partial pressure of the acetaldehyde being treated or when the reaction is carried out at reduced pressure without the aid of a diluent material such as has been enumerated, it is usually necessary to pass the gases issuing from the reaction chamber through a scrubbing or solvent recovery system of some kind for the purpose of recovering the acetone.

A convenient and economical method of attaining the desired reduced pressures is by using as the inert diluent the gaseous reaction products formed in the process. The required proportion of these gaseous products, after the removal of the acetone, unconverted acetaldehyde and any other condensible product that may be formed by side reaction, by condensation, scrubbing or other suitable method, and supplemented by additional inert material, if necessary, is mixed with acetaldehyde vapor and again passed over the catalyst. In this way, the process may be carried out in a cyclic manner, the required partial pressure of the acetaldehyde being maintained by purging at intervals or continuously, a portion of the gaseous reaction products, or, if necessary, making additions of gaseous inert material from an auxiliary source of supply. The mass action effect of these gaseous reaction products employed as diluents is apparently small since the conversion of acetaldehyde to acetone is only slightly reduced by their use.

After a number of days use the catalyst begins to lose its efficiency and the rate of conversion of acetaldehyde to acetone decreases appreciably. I have found, however, that the original efficiency of the catalyst may be easily and quickly restored. When the rate of conversion has decreased to a point beyond which the operation of the process is not economical, the operation may be stopped and the catalyst reactivated by passing over it oxygen or oxygen containing gas such as air, for a number of hours at temperatures of about 450°–600° C.

The table given below shows experimental results obtained under different operating conditions:

| Catalyst | Grm. acetaldehyde per c.c. of cat. per hr. | Temp. °C. | Acetaldehyde partial pressure mm. | Means of attaining partial pressure | Conversion acetone %* |
|---|---|---|---|---|---|
| #4 | .3 | 400 | | Ordinary pressure | 24 |
| #4 | .8 | 400 | 220 | Carbon dioxide | 75 |
| #4 | .58 | 400 | 160 | ——do—— | 80 |
| #4 | .15 | 400 | 40 | ——do—— | 53 |

* On basis of two mols of acetaldehyde giving one mol of acetone.

The examples shown above are cited merely for the purpose of illustrating the varied conditions under which my new process may be satisfactorily operated and it is distinctly understood that I am not limited by any of the conditions therein stated.

The reactions may be carried out over a fairly wide range of temperatures, say from about 300° C. to about 650° C. I prefer, however, to employ temperatures ranging from about 400° C. to about 500° C. This factor, of course, may be varied considerably depending upon the other factors such as nature of catalyst, rate of flow of acetaldehyde vapor, pressure employed, method of attaining the desired pressure, etc.

The pressure at which the reaction is effected may also be varied over a wide range provided it is maintained appreciably below atmospheric pressure, the percentage of acetaldehyde converted into acetone being increased as the pressure is decreased. I prefer, however, to make use of pressures ranging from about 25 mm. to about 300 mm. (mercury). It is understood, of course, that in this connection I use the terms "pressure" and "reduced pressure" as meaning also "partial pressure" in case the desired reduced pressure of the acetaldehyde is attained by the use of an inert diluent instead of by the use of vacuum. I claim generally the process of effecting the herein described process at reduced pressures and it is distinctly understood that I do not confine myself to any particular method of attaining the desired reduced pressure nor to any particular pressure. For example, I may either maintain a partial vacuum in the reaction vessel or I may attain the same result by diluting the acetaldehyde vapor to be reacted, with a sufficient amount of an inert material (under the conditions of the reaction) to reduce the partial pressure of the acetaldehyde vapor to the desired degree. I prefer to make use of carbon dioxide or nitrogen gases for this purpose.

I have found that my new process may be satisfactorily carried out by the aid of a fairly wide variety of catalysts and while I prefer to employ catalysts of the character described in this specification, it is distinctly understood that I do not confine myself to the use of only such methods.

Now having described my invention, what I claim as new and novel is:

1. A process for the production of acetone which comprises subjecting to the action of catalysts comprising essentially oxygen compounds of metals of the third period of the periodic table at temperatures from 300° C. to 650° C. a gaseous mixture in which acetaldehyde vapor is the only reactant present in substantial concentration and in which the pressure of said acetaldehyde vapor is substantially lower than atmospheric pressure.

2. A process for the production of acetone which comprises subjecting to the action of catalysts comprising essentially oxygen compounds of metals of the third period of the periodic table, at temperatures from 300° C. to 650° C., a gaseous mixture in which acetaldehyde vapor is the only reactant present in substantial concentration.

3. A process for the production of acetone which comprises subjecting to the action of catalysts comprising essentially oxygen compounds of metals of the third period of the periodic table at a temperature of about 400° C. a gaseous mixture in which acetaldehyde vapor is the only reactant present in substantial concentration.

4. A process for the production of acetone which comprises subjecting to the action of catalysts comprising essentially oxygen compounds of metals of the third period of the periodic table at a temperature of about 400° C. a gaseous mixture in which acetaldehyde vapor is the only reactant present in substantial concentration and in which the pressure of said acetaldehyde vapor is between 25 mm. and 300 mm. of mercury.

5. A process for the production of acetone which comprises subjecting to the action of catalysts comprising essentially oxygen compounds of metals of the third period of the periodic table and of an auxiliary substance promoting the activity of the catalyst selected from the group consisting of oxygen compounds of alkaline earth metals and magnesium, at temperatures from 300° C. to 650° C., a gaseous mixture in which acetaldehyde vapor is the only reactant present in substantial concentration.

6. A process for the production of acetone which comprises subjecting to the action of catalysts comprising essentially oxygen compounds of metals of the third period of the periodic table and of an auxiliary substance promoting the activity of the catalyst selected from the group consisting of oxygen compounds of alkaline earth metals and magnesium, at temperatures from 300° C. to 650° C., a gaseous mixture in which acetaldehyde vapor is the only reactant present in substantial concentration and in which the pressure of said acetaldehyde vapor is substantially lower than atmospheric pressure.

7. A process for the production of acetone which comprises subjecting to the action of catalysts essentially comprising (initially) a plurality of difficultly reducible metal oxides, a plurality of easily reducible metal oxides, and a metal halide, at temperatures from 300° C. to 650° C., a gaseous mixture in which acetaldehyde vapor is the only reactant present in substantial concentration.

8. A process for the production of acetone which comprises subjecting to the action of catalysts essentially comprising (initially) a plurality of difficultly reducible metal oxides, a plurality of easily reducible metal oxides and a metal halide, at temperatures from 300° C. to 650° C., a gaseous mixture in which acetaldehyde vapor is the only reactant present in substantial concentration and in which the pressure of said acetaldehyde vapor is substantially lower than atmospheric pressure.

9. A process for the production of acetone which comprises subjecting to the action of catalysts essentially comprising (initially) a difficultly reducible metal oxide, an easily reducible metal oxide and a metal halide, at temperatures from 300° C. to 650° C., a gaseous mixture in which acetaldehyde vapor is the only reactant present in substantial concentration, and in which the pressure of said acetaldehyde vapor has been reduced to pressures substantially below atmospheric pressure by diluting said acetaldehyde vapor with gaseous materials inert under the conditions of the reaction.

10. A process as claimed in claim 9 in which the acetaldehyde vapor is diluted with sufficient nitrogen gas to give the required reduction in the pressure of the acetaldehyde vapor.

11. A process as claimed in claim 9 in which the acetaldehyde vapor is diluted with sufficient carbon dioxide gas to give the required reduction and pressure of the acetaldehyde vapor.

12. A process as claimed in claim 9 in which the acetaldehyde vapor is diluted with a sufficient amount of the gaseous products previously formed in the reaction to give the required reduction and pressure of the acetaldehyde vapor.

13. A process for the production of acetone which comprises subjecting substantially pure acetaldehyde vapor to the action of catalysts essentially comprising (initially) a difficultly reducible metal oxide, an easily reducible metal oxide and a metal halide at temperatures from 300° C. to 650° C.

14. A process for the production of acetone which comprises subjecting substantially pure acetaldehyde vapor to the action of catalysts essentially comprising (initially) a difficultly reducible metal oxide, an easily reducible metal oxide and a metal halide at temperatures from 300° C. to 650° C. and at pressures substantially lower than atmospheric pressure.

15. A process for the production of acetone which comprises subjecting substantially pure acetaldehyde vapor to the action of catalysts comprising essentially oxygen compounds of metals of the third period of the periodic table at temperatures from 300° C. to 650° C. and at pressures substantially lower than atmospheric pressure.

16. A process for the production of acetone which comprises subjecting substantially pure acetaldehyde vapor to the action of catalysts comprising essentially oxygen compounds of metals of the third period of the periodic table and of an auxiliary substance promoting the activity of the catalysts selected from the group consisting of oxygen compounds of alkaline earth metals and magnesium, at temperatures from 300° C. to 650° C. and at pressures substantially lower than atmospheric pressure.

17. A process for the production of acetone which comprises subjecting substantially pure acetaldehyde vapor to the action of catalysts essentially comprising (initially) a plurality of difficultly reducible metal oxides, a plurality of easily reducible metal oxides, and a metal halide, at temperatures from 300° C. to 650° C. and at pressures substantially lower than atmospheric pressure.

18. A process for the production of acetone which comprises subjecting to the action of catalysts comprising essentially oxygen compounds of metals selected from the group consisting of iron, copper and manganese at temperatures from 300° C. to 650° C. a gaseous mixture in which acetaldehyde vapor is the only reactant present in substantial concentrations and in which the pressure of said acetaldehyde vapor is substantially lower than atmospheric pressure.

19. A process for the production of acetone which comprises subjecting to the action of catalysts comprising initially essentially zinc oxide, iron oxide and zinc chloride, at temperatures from 300° C. to 650° C. a gaseous mixture in which acetaldehyde vapor is the only reactant present in substantial concentration and in which the pressure of said acetaldehyde vapor is substantially lower than atmospheric pressure.

20. A process for the production of acetone which comprises subjecting to the action of catalysts chosen from the group consisting of catalysts essentially comprising oxygen compounds of metals of the third period of the periodic table and catalytic masses essentially comprising (initially) a difficultly reducible metal oxide, an easily reducible metal oxide and a metal halide at temperatures from 300° C. to 650° C., a gaseous mixture in which acetaldehyde vapor is the only reactant present in substantial concentration and in which the pressure of said acetaldehyde vapor is substantially lower than atmospheric pressure.

21. A process for the production of acetone which comprises subjecting to the action of catalysts chosen from the group consisting of catalysts essentially comprising oxygen compounds of metals of the third period of the periodic table and catalytic masses essentially comprising (initially) a difficultly reducible metal oxide, an easily reducible metal oxide and a metal halide at temperatures from 300° C. to 650° C., a gas consisting of acetaldehyde vapor.

22. A process for the production of acetone which comprises subjecting to the action of catalysts chosen from the group consisting of catalysts essentially comprising oxygen compounds of metals of the third period of the periodic table and catalytic masses essentially comprising (initially) a difficultly reducible metal oxide, an easily reducible metal oxide and a metal halide at temperatures from 300° C. to 650° C., a gas consisting of acetaldehyde vapor, the pressure of said acetaldehyde vapor being substantially lower than atmospheric.

23. In a catalytic process for the production of acetone from gas mixture containing acetaldehyde vapor as a major component, the improvement which comprises subjecting the gaseous reactant mixture, at temperatures from 300° C. to 650° C., to the action of a catalyst essentially comprising (initially) a mixture of easily-reducible and difficultly-reducible metal oxides and a metal halide.

24. In a catalytic process for the production of acetone from gas mixtures containing acetaldehyde vapor as a major component, the improvement which comprises subjecting the gaseous reactant mixture, at temperatures from 300° C. to 650° C., to the action of a catalyst essentially comprising (initially) a mixture of chromium oxide, iron oxide, zinc oxide and zinc chloride.

LLOYD C. SWALLEN.

Certificate of Correction

Patent No. 1,970,782.  August 21, 1934.

LLOYD C. SWALLEN

It is hereby certified that errors appear in the printed specification of the above numbered patent requiring correction as follows: Page 1, line 94, strike out the formula and insert instead $(Zn(NO_3)_2.6H_2O)$; page 2, line 116, for the right-hand portion of the formula "$CH_4CO$" read $CH_4 + CO$; and that the said Letters Patent should be read with these corrections therein that the same may conform to the record of the case in the Patent Office.

Signed and sealed this 2d day of October, A. D. 1934.

[SEAL]  LESLIE FRAZER,
*Acting Commissioner of Patents.*